(12) United States Patent
Wang

(10) Patent No.: US 7,118,793 B2
(45) Date of Patent: Oct. 10, 2006

(54) THREE-DIMENSIONAL FOAMABLE STRUCTURE WITH WEAR-RESISTANT FEATURE

(76) Inventor: Swei Mu Wang, No. 3, Lane 229, Daya Rd., Daya Shiang, Taichung 428 (TW)

( * ) Notice: Subject to any disclaimer, the term of this patent is extended or adjusted under 35 U.S.C. 154(b) by 419 days.

(21) Appl. No.: 10/681,901

(22) Filed: Oct. 10, 2003

(65) Prior Publication Data

US 2004/0076812 A1    Apr. 22, 2004

Related U.S. Application Data

(63) Continuation-in-part of application No. 10/151,902, filed on May 22, 2002, now Pat. No. 6,743,385.

(51) Int. Cl.
*B32B 3/26* (2006.01)
(52) U.S. Cl. .............. 428/132; 36/44; 428/13; 428/304.4; 428/908.8
(58) Field of Classification Search ......... 428/132, 428/304.4, 13, 908.8; 36/44
See application file for complete search history.

(56) References Cited

U.S. PATENT DOCUMENTS

| | | | | |
|---|---|---|---|---|
| 4,134,942 A | * | 1/1979 | Mirr et al. .............. 264/418 |
| 4,581,187 A | * | 4/1986 | Sullivan et al. .......... 264/46.4 |
| 5,141,578 A | * | 8/1992 | Yang ...................... 156/79 |
| 5,147,589 A | * | 9/1992 | Chang et al. ............ 264/45.1 |
| 5,308,420 A | * | 5/1994 | Yang ...................... 156/79 |
| 5,318,645 A | * | 6/1994 | Yang ...................... 156/79 |
| 5,814,254 A | * | 9/1998 | Bisconti ................. 264/46.4 |
| 5,972,257 A | * | 10/1999 | Liu ....................... 264/40.4 |
| 6,045,733 A | * | 4/2000 | Chu et al. .............. 264/46.6 |
| 6,238,602 B1 | * | 5/2001 | Liu ....................... 264/40.1 |
| 6,266,896 B1 | * | 7/2001 | Liu ....................... 36/28 |

* cited by examiner

*Primary Examiner*—Allan R. Kuhns
(74) *Attorney, Agent, or Firm*—Charles E. Baxley

(57) ABSTRACT

A foamable structure includes a film shell having a bottom face and a peripheral wall, and a foamable material mounted in the film shell and having a bottom face combined with the bottom face of the film shell, and a peripheral wall combined with the peripheral wall of the film shell. Thus, the film shell is coated on the periphery of the foamable material, so that the film shell is combined with the foamable material rigidly and stably, thereby preventing the foamable material from detaching from the film shell due to a pulling action of an external force.

10 Claims, 3 Drawing Sheets

THREE-DIMENSIONAL FOAMABLE STRUCTURE WITH WEAR-RESISTANT FEATURE

CROSS-REFERENCES TO RELATED APPLICATIONS

The present invention is a continuation-in-part application of the co-pending U.S. Ser. No. 10/151,902, filed on May 22, 2002 now U.S. Pat. No. 6,743,385.

BACKGROUND OF THE INVENTION

1. Field of the Invention

The present invention relates to a three-dimensional foamable structure with a wear-resistant feature, and more particularly to a three-dimensional foamable structure, wherein the film shell is coated on the periphery of the foamable material, so that the film shell is combined with the foamable material rigidly and stably, thereby preventing the foamable material from detaching from the film shell due to a pulling action of an external force.

2. Description of the Related Art

A conventional foamable product is available for an article, such as a shoe sole, a chair seat, a purse, a sport protective equipment or the like. The foamable product is integrally formed by a foamable material. Usually, the foamable product made by the foamable material has poor outer appearance and is not wear-resistant. Thus, the surface of the foamable product is coated with a cloth or leather layer.

However, the cloth layer cannot surround the periphery of the foamable product completely, so that the cloth layer is not combined with the foamable product rigidly and stably. Thus, the cloth layer is easily detached from the foamable product due to a pulling action of an external force. In addition, the water will infiltrate through the periphery into the foamable product, thereby decreasing the lifetime of the foamable product. Further, the pattern or color printed on the outer layer of the foamable product is easily stripped or broken during a long-term utilization, thereby decreasing the aesthetic quality of the foamable product.

SUMMARY OF THE INVENTION

The present invention is to mitigate and/or obviate the disadvantage of the conventional foamable product.

The primary objective of the present invention is to provide a three-dimensional foamable structure with a wear-resistant feature.

Another objective of the present invention is to provide a three-dimensional foamable structure, wherein the film shell is coated on the periphery of the foamable material, so that the film shell is combined with the foamable material rigidly and stably, thereby preventing the foamable material from detaching from the film shell due to a pulling action of an external force.

A further objective of the present invention is to provide a three-dimensional foamable structure, wherein the film shell is coated on the periphery of the foamable material, so that water will not infiltrate through the periphery into the foamable material, thereby increasing the lifetime of the three-dimensional foamable structure.

A further objective of the present invention is to provide a three-dimensional foamable structure, wherein the pattern layer having various patterns and colors is mounted between the film shell and the foamable material, so that the pattern layer is protected by the film shell made of wear-resistant material, thereby enhancing the aesthetic quality of the three-dimensional foamable structure.

In accordance with the present invention, there is provided a foamable structure, comprising:

a film shell having a bottom face, a peripheral wall integrally formed on a periphery of the bottom face of the film shell, and a three-dimensional receiving space formed in the peripheral wall of the film shell; and a foamable material mounted in the film shell and having a bottom face combined with an inner side of the bottom face of the film shell, and a peripheral wall located adjacent to the bottom face of the foamable material and combined with an inner side of the peripheral wall of the film shell.

Further benefits and advantages of the present invention will become apparent after a careful reading of the detailed description with appropriate reference to the accompanying drawings.

DETAILED DESCRIPTION OF THE INVENTION

Figure 1:
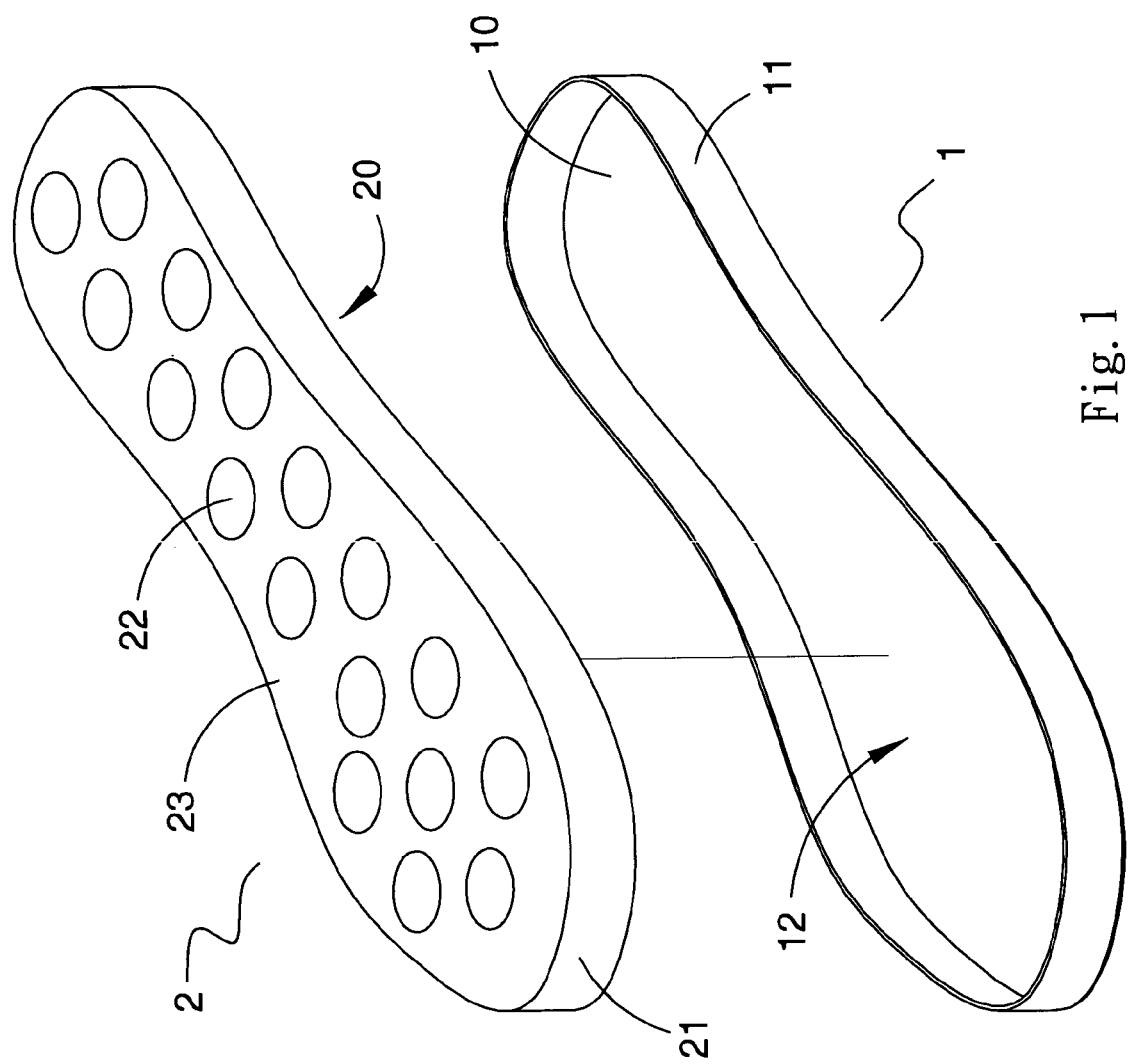
FIG. 1 is an exploded perspective view of a three-dimensional foamable structure in accordance with the preferred embodiment of the present invention.
Figure 2:
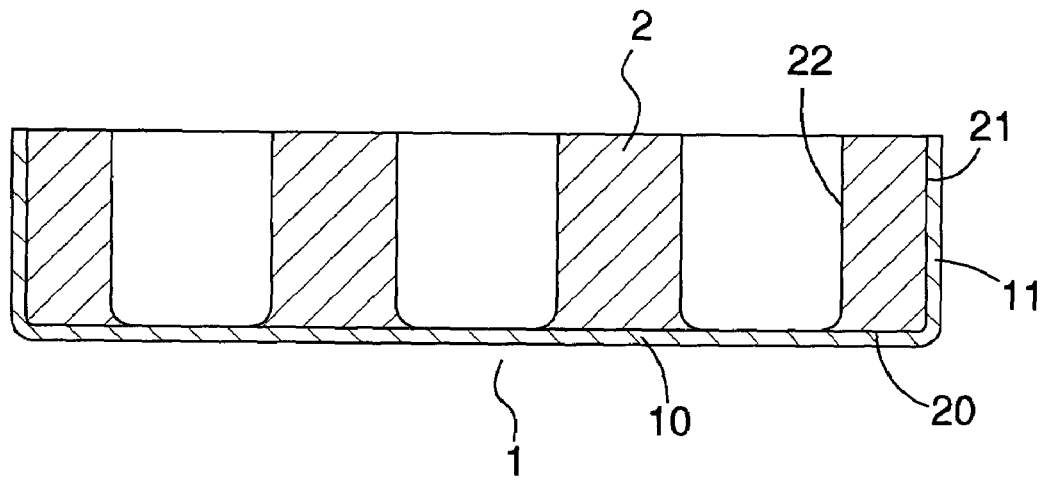
FIG. 2 is a front plan cross-sectional assembly view of the three-dimensional foamable structure as shown in FIG. 1.

Referring to the drawings and initially to FIGS. 1 and 2, a three-dimensional foamable structure with a wear-resistant feature in accordance with the preferred embodiment of the present invention comprises a film shell 1, and a foamable material 2.

The film shell 1 is made of a wear-resistant material. The film shell 1 has a bottom face 10, a peripheral wall 11 integrally formed on a periphery of the bottom face 10 and extended upward, and a three-dimensional receiving space 12 formed in the peripheral wall 11 and facing upward.

The foamable material 2 is mounted in the receiving space 12 of the film shell 1 and has a bottom face 20 combined with an inner side of the bottom face 10 of the film shell 1, and a peripheral wall 21 located adjacent to the bottom face 20 and combined with an inner side of the peripheral wall 11 of the film shell 1. The foamable material 2 is formed with a plurality of fitting holes 22 each extended through a top face 23 of the foamable material 2, so that the top face 23 of the foamable material 2 is combined with other article easily.

Figure 3:
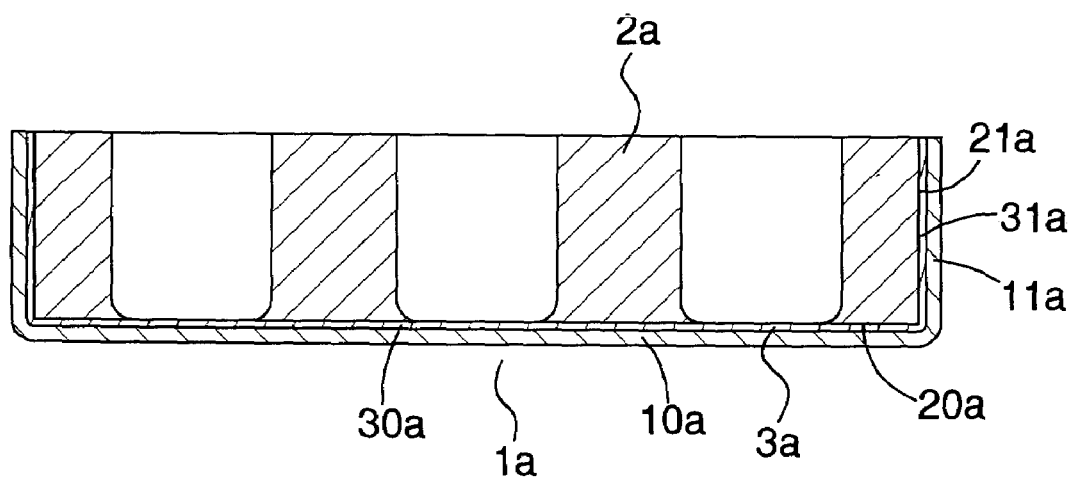
FIG. 3 is a front plan cross-sectional assembly view of a three-dimensional foamable structure in accordance with another embodiment of the present invention.

Referring to FIG. 3, the three-dimensional foamable structure further comprises a pattern layer 3a mounted between the film shell 1a and the foamable material 2a. The film shell 1a is made of a transparent material. The pattern layer 3a is provided with various patterns and colors. The pattern layer 3a has a bottom face 30a combined with the bottom face 10a of the film shell 1a and the bottom face 20a of the foamable material 2a, and a peripheral wall 31a combined with the peripheral wall 11a of the film shell 1a and the peripheral wall 21a of the foamable material 2a.

Figure 4:
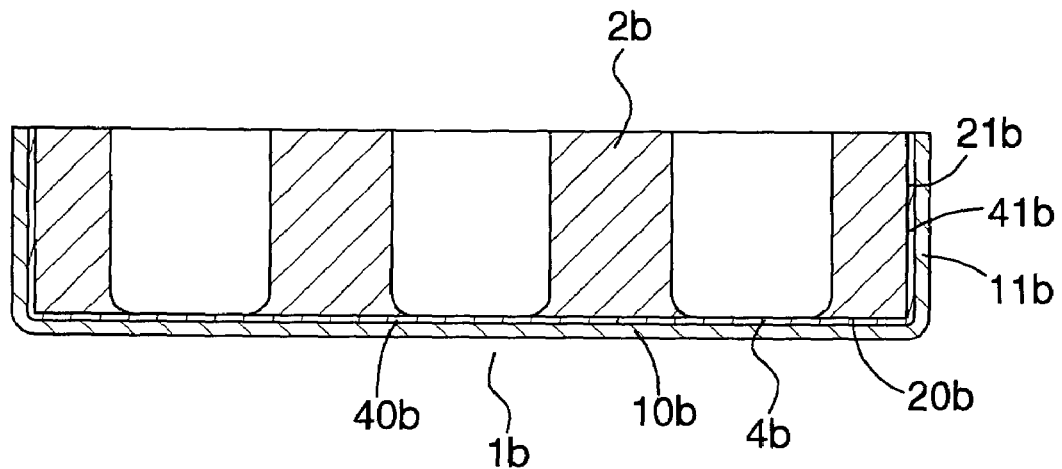
FIG. 4 is a front plan cross-sectional assembly view of a three-dimensional foamable structure in accordance with another embodiment of the present invention.

Referring to FIG. 4, the three-dimensional foamable structure further comprises a cloth layer 4b mounted between the film shell 1b and the foamable material 2b. The film shell 1b is made of a transparent material. The cloth layer 4b has a bottom face 40b combined with the bottom face 10b of the film shell 1b and the bottom face 20b of the foamable material 2b, and a peripheral wall 41b combined with the peripheral wall 11b of the film shell 1b and the peripheral wall 21b of the foamable material 2b.

Figure 5:
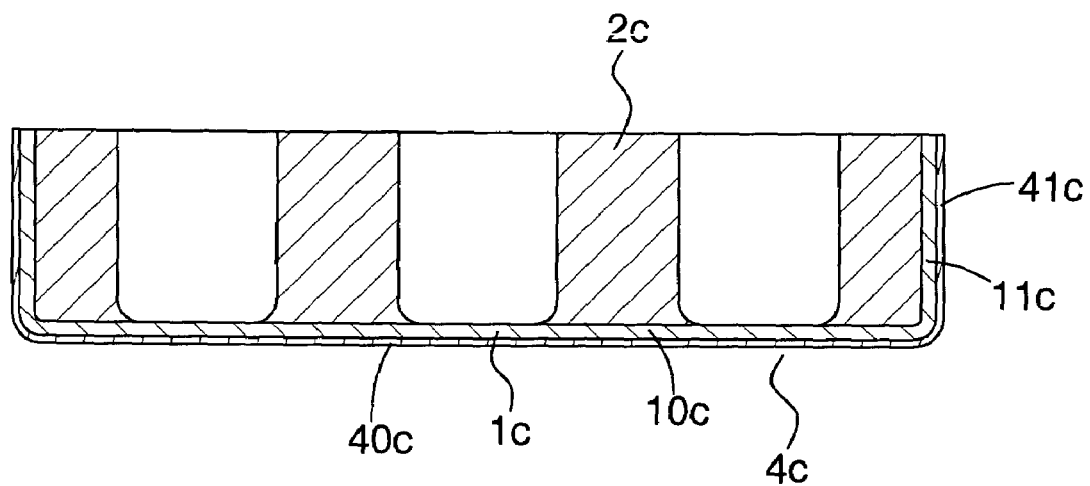
FIG. 5 is a front plan cross-sectional assembly view of a three-dimensional foamable structure in accordance with another embodiment of the present invention.

Referring to FIG. 5, the film shell 1c is coated on a periphery of the foamable material 2c, and the three-dimensional foamable structure further comprises a cloth layer 4c coated on the film shell 1c. The cloth layer 4c has a bottom face 40c combined with the bottom face 10c of the film shell 1c, and a peripheral wall 41c combined with the peripheral wall 11c of the film shell 1c.

Accordingly, the three-dimensional foamable structure of the present invention has the following advantages.

1. The film shell is coated on the periphery of the foamable material, so that the film shell is combined with the foamable material rigidly and stably, thereby preventing the foamable material from detaching from the film shell due to a pulling action of an external force.

2. The film shell is coated on the periphery of the foamable material, so that water will not infiltrate through the periphery into the foamable material, thereby increasing the lifetime of the three-dimensional foamable structure.

3. The pattern layer having various patterns and colors is mounted between the film shell and the foamable material, so that the pattern layer is protected by the film shell made of wear-resistant material, thereby enhancing the aesthetic quality of the three-dimensional foamable structure.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A foamable structure, comprising:
a film shell having a bottom face, a peripheral wall integrally formed on a periphery of the bottom face of the film shell, and a three-dimensional receiving space formed in the peripheral wall of the film shell; and
a foamable material mounted in the film shell and having a bottom face combined with an inner side of the bottom face of the film shell, and a peripheral wall located adjacent to the bottom face of the foamable material and combined with an inner side of the peripheral wall of the film shell, and
a cloth layer mounted between the film shell and the foamable material.

2. The foamable structure in accordance with claim 1, wherein the film shell is made of a wear-resistant material.

3. The foamable structure in accordance with claim 1, wherein the foamable material is formed with a plurality of fitting holes.

4. The foamable structure in accordance with claim 3, wherein each of the fitting holes of the foamable material is extended through a top face of the foamable material.

5. The foamable structure in accordance with claim 1, wherein the film shell is made of a transparent material.

6. The foamable structure in accordance with claim 1, wherein the cloth layer has a bottom face combined with the bottom face of the film shell and the bottom face of the foamable material, and a peripheral wall combined with the peripheral wall of the film shell and the peripheral wall of the foamable material.

7. The foamable structure in accordance with claim 1, wherein the film shell is coated on a periphery of the foamable material.

8. The foamable structure in accordance with claim 1, wherein the bottom face of the film shell is extended upward, and the receiving space of the film shell faces upward.

9. A foamable structure, comprising:
a film shell having a bottom face, a peripheral wall integrally formed on a periphery of the bottom face of the film shell, and a three-dimensional receiving space formed in the peripheral wall of the film shell,
a foamable material mounted in the film shell and having a bottom face combined with an inner side of the bottom face of the film shell, and a peripheral wall located adjacent to the bottom face of the foamable material and combined with an inner side of the peripheral wall of the film shell, and
a pattern layer mounted between the film shell and the foamable material, the pattern layer being provided with various patterns and colors, and including a bottom face combined with the bottom face of the film shell and the bottom face of the foamable material, and a peripheral wall combined with the peripheral wall of the film shell and the peripheral wall of the foamable material.

10. The foamable structure in accordance with claim 9, wherein the film shell is made of a transparent material.

* * * * *